US010531417B2

(12) United States Patent
Matsumoto et al.

(10) Patent No.: US 10,531,417 B2
(45) Date of Patent: Jan. 7, 2020

(54) TIME SYNCHRONIZATION SYSTEM

(71) Applicant: HITACHI, LTD., Tokyo (JP)

(72) Inventors: Hisanori Matsumoto, Tokyo (JP); Shiro Mazawa, Tokyo (JP); Yasutaka Serizawa, Tokyo (JP)

(73) Assignee: HITACHI, LTD., Tokyo (JP)

(*) Notice: Subject to any disclaimer, the term of this patent is extended or adjusted under 35 U.S.C. 154(b) by 332 days.

(21) Appl. No.: 15/627,791

(22) Filed: Jun. 20, 2017

(65) Prior Publication Data

US 2018/0063805 A1    Mar. 1, 2018

(30) Foreign Application Priority Data

Aug. 23, 2016  (JP) .................. 2016-162375

(51) Int. Cl.
| | |
|---|---|
| H04W 56/00 | (2009.01) |
| G01V 1/26 | (2006.01) |
| G01S 19/39 | (2010.01) |
| G01S 19/14 | (2010.01) |
| G01S 19/01 | (2010.01) |
| G01V 1/24 | (2006.01) |
| G08C 17/02 | (2006.01) |
| G01V 1/22 | (2006.01) |

(52) U.S. Cl.
CPC .......... *H04W 56/006* (2013.01); *G01S 19/01* (2013.01); *G01S 19/14* (2013.01); *G01S 19/39* (2013.01); *G01V 1/247* (2013.01); *G01V 1/26* (2013.01); *G08C 17/02* (2013.01); *G01V 1/22* (2013.01); *G01V 2200/12* (2013.01)

(58) Field of Classification Search
CPC ...... H04W 56/006; G01S 19/01; G01S 19/14; G01S 19/39; G01V 1/247; G01V 1/26; G08C 17/02
USPC ...................................... 342/375
See application file for complete search history.

(56) References Cited

U.S. PATENT DOCUMENTS

| | | |
|---|---|---|
| 7,002,350 B1 | 2/2006 | Barringer |
| 8,655,578 B2 | 2/2014 | Sambongi |
| 2007/0213931 A1 | 9/2007 | Yoon et al. |

(Continued)

FOREIGN PATENT DOCUMENTS

JP    2011-149925 A    8/2011

*Primary Examiner* — Harry K Liu

(74) *Attorney, Agent, or Firm* — Volpe and Koenig, P.C.

(57) ABSTRACT

A time synchronization system includes: a position information acquisition unit configured to acquire installation position information related to an installation position of a time synchronization target whose time is synchronized; a time synchronization signal acquisition unit configured to receive a positioning signal transmitted from a positioning satellite as a time synchronization signal and acquire, from the time synchronization signal, transmission position information related a position of the positioning satellite and transmission time information at timing when the time synchronization signal is transmitted; and a signal processing unit configured to calculate synchronized time information for the time synchronization target based on the installation position information of the time synchronization target and the transmission position information and transmission time information from the time synchronization signal, and transmit the synchronized time information to the time synchronization target.

6 Claims, 8 Drawing Sheets

(56) References Cited

U.S. PATENT DOCUMENTS

| | | | | |
|---|---|---|---|---|
| 2011/0058452 A1* | 3/2011 | Elkington | ............... | G01V 1/20 367/37 |
| 2011/0090759 A1* | 4/2011 | Laycock | ............... | G01V 1/003 367/51 |
| 2011/0141850 A1* | 6/2011 | Scott | ................. | G01V 1/26 367/50 |
| 2015/0268352 A1* | 9/2015 | Fischer | ................. | G01S 19/23 342/357.27 |
| 2015/0304020 A1* | 10/2015 | Rebec | ................. | H04H 20/74 370/316 |
| 2018/0292556 A1* | 10/2018 | Cotton | ................. | G01V 1/36 |

* cited by examiner

TIME SYNCHRONIZATION SYSTEM

CLAIM OF PRIORITY

The present application claims priority from Japanese patent application JP 2016-162375 filed on Aug. 23, 2016, the content of which is hereby incorporated by reference into this application.

BACKGROUND OF THE INVENTION

1. Field of the Invention

The present invention relates to a time synchronization system.

2. Description of the Related Art

In a resource exploration such as petroleum exploration, ground investigation is performed by generating a seismic wave with a vibrator and detecting vibration of the ground with a sensor (geophone). Then, by analyzing the detected vibration, a location and an amount of resource under the ground are calculated. In such a ground investigation, generally, a plurality of sensors are used and vibration is observed by those sensors simultaneously. Then, to acquire an analysis result with high accuracy, clocks in each device such as the vibrator and geophone need to be synchronized.

As a time synchronization method, for example, a wired communication performed by connecting a cable to each device to perform time synchronization performed is widely known. However, regarding the next generation resource exploration system, for example, it is considered to use one million sensors and accordingly time synchronization by a wired communication becomes practically difficult. Thus, it has been considered to perform time synchronization by a wireless communication.

As time synchronization by a wireless communication, for example, a satellite positioning system (GNSS: Global Navigation Satellite System), typified by GPS, is known in general as described in U.S. Pat. No. 7,002,350-B, JP-2011-149925-A, and US-2007/0213931-A. In a satellite positioning system, based on a positioning signal received from a positioning satellite, time synchronized with the positioning satellite is calculated.

SUMMARY OF THE INVENTION

A positioning signal includes four parameters including position information (transmission position information) and transmission time of the positioning satellite at the timing when the signal is transmitted. Thus, in the satellite positioning system, it is needed to calculate position information (xu, yu, zu) and time information (tu) of a sensor based on the following four expressions.

$$(xs_1-xu)^2+(ys_1-yu)^2+(zs_1-zu)^2=[vc(ts_1-tu)]^2$$

$$(xs_2-xu)^2+(ys_2-yu)^2+(zs_2-zu)^2=[vc(ts_2-tu)]^2$$

$$(xs_3-xu)^2+(ys_3-yu)^2+(zs_3-zu)^2=[vc(ts_3-tu)]^2$$

$$(xs_4-xu)^2+(ys_4-yu)^2+(zs_4-zu)^2=[vc(ts_4-tu)]^2$$

Here, the symbols ($xs_n$, $ys_n$, and $zs_n$) (n=1, 2, 3, or 4) represent position information of each satellite at the timing when the received positioning signal is transmitted and the symbol ($ts_n$) (n=1, 2, 3, or 4) represents transmission time information when the positioning signal is transmitted.

Thus, each device such as a sensor performs time synchronization by the satellite positioning system by receiving four or more positioning satellites and receiving positioning signals.

However, when the sensor such as a geophone is buried underground, the number of receivable positioning satellite reduces down to about 1 to 3 for example. In this case, since a sufficient number of positioning signals are not received, the time synchronization by using the satellite positioning system can not be performed.

In view of the above problem, the present invention has an object to provide a time synchronization system that can perform time synchronization even in a case that a small number of positioning satellites are received.

Regarding the invention disclosed in this application, the followings are brief descriptions of outlines of typical examples.

A time synchronization system according to a representative embodiment of the present invention includes: a position information acquisition unit configured to acquire installation position information related to an installation position of a time synchronization target whose time is synchronized; a time synchronization signal acquisition unit configured to receive a positioning signal transmitted from a positioning satellite as a time synchronization signal and acquire, from the time synchronization signal, transmission position information related a position of the positioning satellite and transmission time information at timing when the time synchronization signal is transmitted; and a signal processing unit configured to calculate synchronized time information for the time synchronization target based on the installation position information of the time synchronization target and the transmission position information and transmission time information from the time synchronization signal, and transmit the synchronized time information to the time synchronization target.

Regarding the invention disclosed in this application, effects provided by the typical examples will be briefly described as follows.

In other words, according to representative embodiments of the present invention, there provided a time synchronization system that can perform time synchronization even in a case that a small number of receivable positioning satellites are received.

DESCRIPTION OF THE PREFERRED EMBODIMENTS

Figure 1:
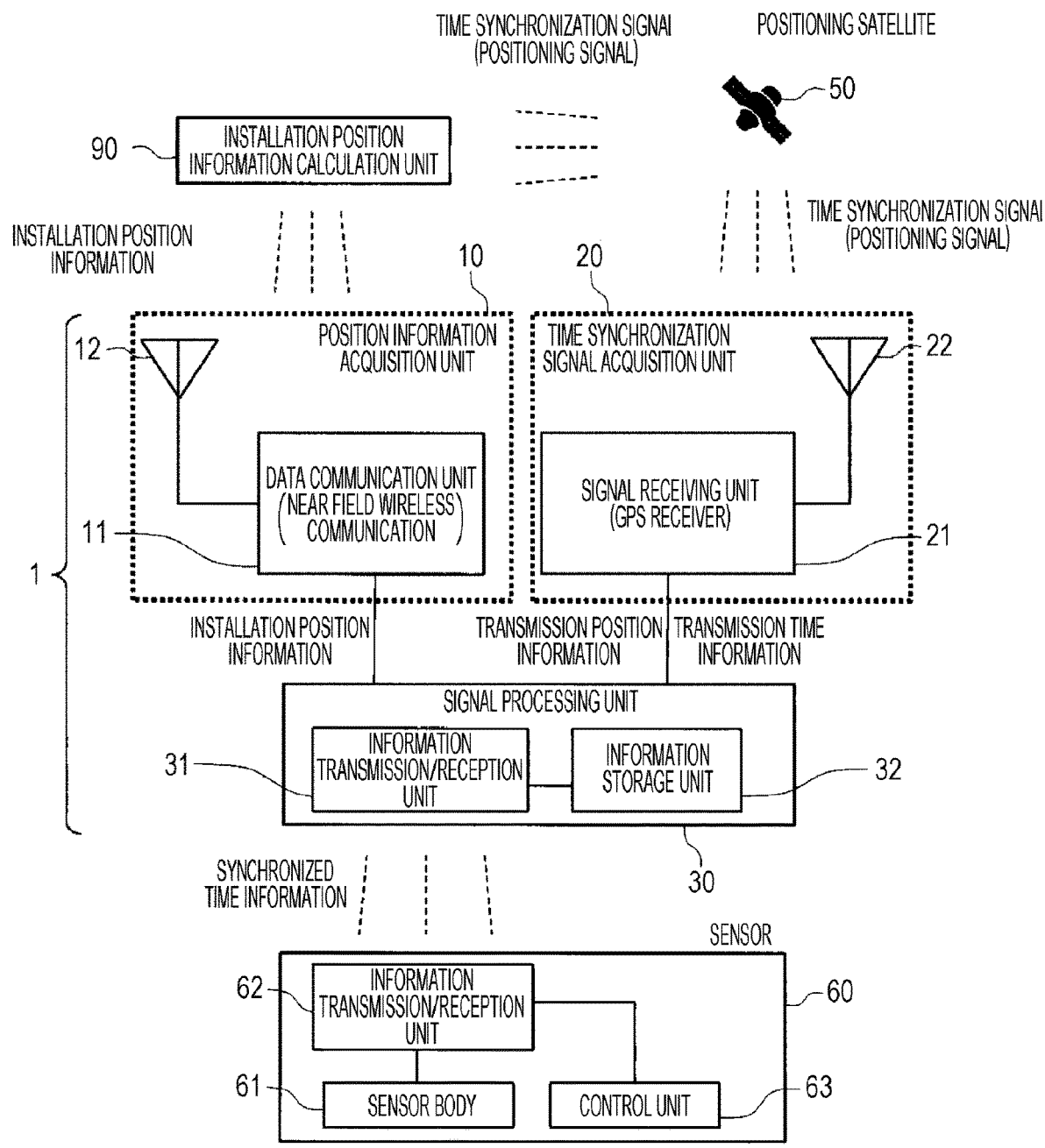
FIG. 1 is a block diagram illustrating an example of a time synchronization system according to a first embodiment of the present invention.

Hereinafter, embodiments of the present invention will be described in detail with reference to the drawings. Here, in all the drawings explaining the embodiments, a same reference numeral is basically applied to same parts, and the explanation thereof is not repeated. Further, to make the drawings clear to understand, hatching may be applied even in a plain view.

Further, in the following embodiments, a configuration will be explained by dividing into more than one sections or embodiments according to need; however, those sections or embodiments are not unrelated but one may be a modification, a detail, supplemental explanation or the like of a part or entire of the other except for a case that it is particularly stated so.

Further, in the following embodiments, when it is described a number of elements or the like (including the number, value, quantity, range or the like), the particular number does not set any limitation and the number may be any number which is greater or smaller than the particular number, except for a case that it is particularly stated so or a case that the number is principally and clearly limited to the particular number.

Further, in the following embodiments, it is obvious that the components (including component steps or the like) thereof are not always essential except for a case that it is particularly stated so or a case that the components are obviously essential in principle.

Further, in the following embodiments, regarding the components or the like, it is obvious that, when an expression such as "is composed of A," "has A," and "includes A" is used, it does not mean to exclude other components, except for a case that it is particularly stated that there is only the component. Similarly, in the following embodiments, when a shape of a component or the like, a positional relationship, and the like are described, a component having a practically similar or comparable shape or the like is included, except for a case that it is particularly stated so or clearly considered that such a similar or comparable component is not included. This applies to the above value, range, and the like.

First Embodiment

Device Configuration

FIG. 1 is a block diagram illustrating an example of a time synchronization system according to a first embodiment of the present invention. As illustrated in FIG. 1, a time synchronization system 1 includes a position information acquisition unit 10, a time synchronization signal acquisition unit 20, a signal processing unit 30, and the like.

The position information acquisition unit 10 includes a data communication unit 11 and an antenna 12, for example, as illustrated in FIG. 1. The data communication unit 11 transmits and receives various information such as later described installation position information and the like to and from a later described installation position information calculation unit 90 or the like by a near field wireless communication. As the near field radio communication, for example, Wi-Fi (registered trademark), Zigbee (registered trademark), Bluetooth (registered trademark), Ultra Wide Band (UWB), millimeter wave communication, Near field radio communication (NFC), WiSUM, and the like are preferably used. Further, in addition to the above, as the near field wireless communication, a wide area network (WAN) including Long Term Evolution (LTE), Wideband Code Division Multiple Access (W-CDMA), CDMA2000, Worldwide Interoperability for Microwave Access, registered trademark (WiMAX) or the like and a metropolitan area network (MAN) may be used.

The position information acquisition unit 10 acquires installation position information of a vibrator (time synchronization target) for generating a seismic wave and a sensor (time synchronization target) 60 such as a geophone for detecting a seismic wave, for example. More specifically, each device of the vibrator, sensor 60, or the like is a time synchronization target whose time is synchronized with another device, and the position information acquisition unit 10 acquires installation position information related to installation positions of those time synchronization targets from the installation position information calculation unit 90. The position information acquisition unit 10 outputs the installation position information of the time synchronization targets to the signal processing unit 30. The signal processing unit 30 stores the installation position information output from the position information acquisition unit 10 in an information storage unit 32 illustrated in FIG. 1 for example.

Here, the installation position information calculation unit 90 calculates installation position information of the time synchronization targets as follows. The installation position information calculation unit 90 is composed of a positioning signal receiving unit for receiving a positioning signal transmitted from a positioning satellite 50, an antenna, or the like for example. The installation position information calculation unit 90 receives a positioning signal at the installation position of the sensor 60 for example and calculates installation position information (xu, yu, zu) of the time synchronization target based on the positioning signal received from the positioning satellite 50. The installation position information calculation unit 90 receives a GPS signal or the like as a positioning signal, for example. Here, the installation position information calculation unit 90 receives the positioning signals from four or more positioning satellites 50 and calculates installation position information of the time synchronization targets.

In this manner, according to the present embodiment, since the position information acquisition unit 10 acquires the installation position information which is calculated in advance, the time synchronization system 1 does not have to calculate the installation position information.

Here, the installation position information calculation unit 90 may transmit the calculated installation position information to the time synchronization targets of the sensor 60 or the like for example. Further, the time synchronization targets such as the sensor 60 or the like may include the above described function of the installation position information calculation unit 90 and the sensor 60 may calculate the installation position information based on the positioning signal. In such a case, the position information acquisition unit 10 receives the information from the installation position information calculation unit 90 or sensor 60, for example.

The time synchronization signal acquisition unit 20 receives the positioning signal transmitted from the positioning satellite 50 as a time synchronization signal and acquires transmission position information ($xs_n$, $ys_n$, $zs_n$) and transmission time information ($ts_n$) of the time synchronization signal based on the time synchronization signal. More specifically, the time synchronization signal acquisition unit 20 acquires position information of the positioning satellite at timing when the time synchronization signal is transmitted and time information at timing when the time synchronization signal is transmitted, which are included in the time synchronization signal. Then, the time synchronization signal acquisition unit outputs the acquired transmission position information and transmission time information to the signal processing unit 30. The signal processing unit 30 may store the transmission position information and transmission time information output from the time synchronization signal acquisition unit 20 in the information storage unit 32 illustrated in FIG. 1 for example.

The time synchronization signal acquisition unit 20 includes a signal receiving unit 21 and an antenna 22 as illustrated in FIG. 1, for example. The signal receiving unit 21 is composed of, for example, a receiver or the like for receiving a positioning signal such as a GPS signal and receives a positioning signal transmitted from the positioning satellite 50 via the antenna 22.

Figure 2:
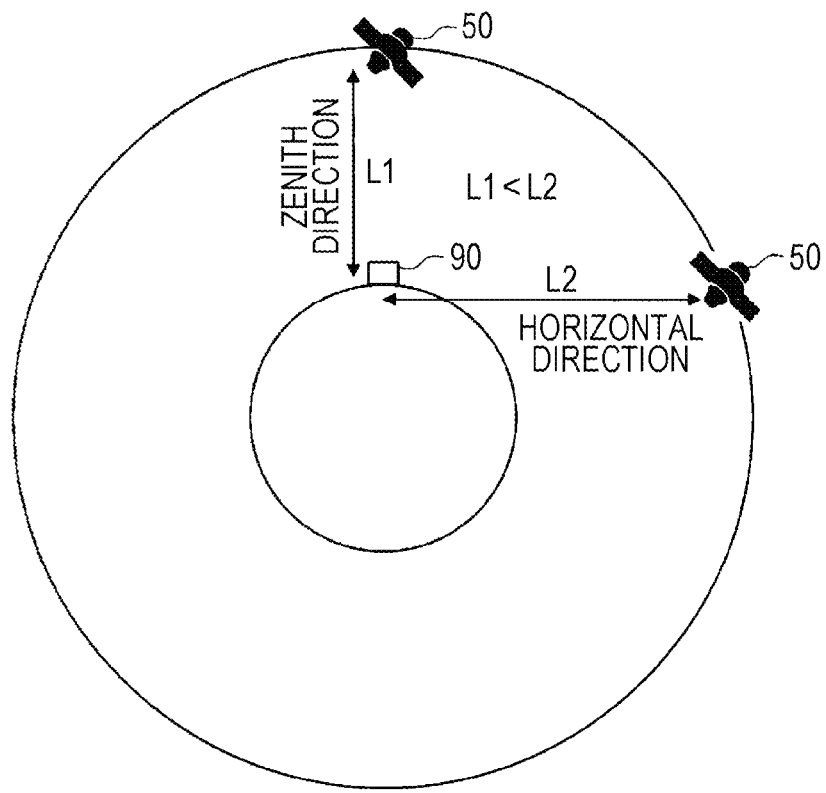
FIG. 2 is a diagram illustrating a difference of positioning signal traveling distances corresponding to the direction of a positioning satellite.

FIG. 2 is a diagram illustrating a difference of positioning signal traveling distances corresponding to the direction of the positioning satellite. The antenna 22 may be an isotropic antenna or a directional antenna. In a case that the antenna 22 is a directional antenna, it is preferable that the antenna 22 is placed facing to the zenith direction for example. In this case, since positioning signals transmitted from the zenith direction, which is a position of a high elevation angle in other words, are selectively received, a signal-to-noise ratio (hereinafter, also referred to as an SN ratio) of the positioning signals is improved. This is because, as illustrated in FIG. 2, the traveling distance L1 of the positioning signal output from the positioning satellite 50 of a high elevation angle in the zenith direction becomes smaller than the traveling distance L2 of the positioning signal output from the positioning satellite 50 of a low elevation angle in the horizontal direction (L1<L2) for example, and noise in the positioning signals is reduced. In this manner, in a case that the antenna 22 is a directional antenna, the time synchronization signal acquisition unit 20 focuses the positioning satellite of the high elevation angle and selectively receives the positioning signal.

The signal processing unit 30 calculates synchronized time information tu of the sensor 60 based on the installation position information (xu, yu, zu) output from the position information acquisition unit 10 and the transmission position information ($xs_n$, $ys_n$, $zs_n$) and transmission time information ($ts_n$) output from the time synchronization signal acquisition unit 20. More specifically, the signal processing unit 30 calculates the synchronized time information (tu) of the sensor 60 based on the following expression.

$$(xs_n-xu)^2+(ys_n-yu)^2+(zs_n-zu)^2=[vc(ts_n-tu)]^2$$

Here, the symbol vc represents a traveling speed of the positioning signal. In other words, the signal processing unit receives one positioning signal and calculates the synchronized time information (tu) of the sensor. The synchronized time information of the sensor 60 is the time synchronized with the positioning satellite 50.

The signal processing unit 30 outputs the calculated synchronized time information to the sensor 60 and synchronizes the time of the sensor 60 with the time of the positioning satellite 50. More specifically, as illustrated in FIG. 1, the signal processing unit 30 includes an information transmission/reception unit 31 and transmits the calculated synchronized time information to the time synchronization target such as the sensor 60 via the information transmission/reception unit 31. The signal processing unit 30 transmits the synchronized time information to the time synchronization target via the above described near field wireless communication or the like for example. Here, according to the present embodiment, since the position information acquisition unit 10 transmits and receives information to and from the installation position information calculation unit 90 by using a near field wireless communication, the signal processing unit 30 may transmit the synchronized time information to the time synchronization target via the position information acquisition unit 10.

Here, it has been described so far that the time synchronization signal acquisition unit 20 acquires the transmission position information and transmission time information based on the time synchronization signal. However, it is not limited to this example and, for example, the time synchronization signal acquisition unit 20 may output the received time synchronization signal to the signal processing unit 30 and the signal processing unit 30 may acquire the transmission position information and transmission time information based on the time synchronization signal. Further, each unit constituting the time synchronization system 1 may be connected to one another by a cable or may have a configuration that information is transmitted wirelessly.

Further, the time synchronization system 1 can perform time synchronization of the time synchronization target again any time after the time synchronization of the time synchronization target such as the sensor 60 is performed. More specifically, the time synchronization signal acquisition unit receives the time synchronization signal again and outputs the transmission position information and transmission time information acquired from the received time synchronization signal to the signal processing unit 30. Then, the signal processing unit 30 calculates the synchronized time information (tu) again based on the installation position information of the time synchronization target stored in the information storage unit 32 or the like and the transmission position information and transmission time information output from the time synchronization signal acquisition unit 20 for example. Then, the signal processing unit 30 transmits the recalculated synchronized time information to the time synchronization target. In this manner, by resynchronizing the time of the time synchronization target with the positioning satellite 50, the time difference between those of the time synchronization target and positioning satellite 50 and the time difference between the plurality of time synchronization targets can be reduced.

As illustrated in FIG. 1, for example, the sensor 60 includes a sensor body 61, an information transmission/reception unit 62, a control unit 63, and the like. The sensor body 61 is composed of a geophone or the like to detect ground vibration for example and acquires sensor information such as vibration.

The information transmission/reception unit 62 receives the synchronized time information transmitted from the signal processing unit 30 by using the above described near field wireless communication or the like for example. Further, the information transmission/reception unit 62 transmits the sensor information acquired by the sensor body 61 to an unillustrated external device or the like for example.

The control unit 63 is composed of a computer such as a CPU and an MPU for example and controls each unit constituting the sensor 60. The control unit 63 has a timer function and synchronizes the time of the sensor 60 with the time of the positioning satellite 50 based on the synchronized time information received by the information transmission/reception unit 62 for example. Further, the control unit 63 defines timings of turning on and off or the like of the sensor body 61. Further, the control unit 63 transmits the sensor information acquired by the sensor body 61 to an external device via the information transmission/reception unit 62.

Time Synchronization Method

Figure 3:
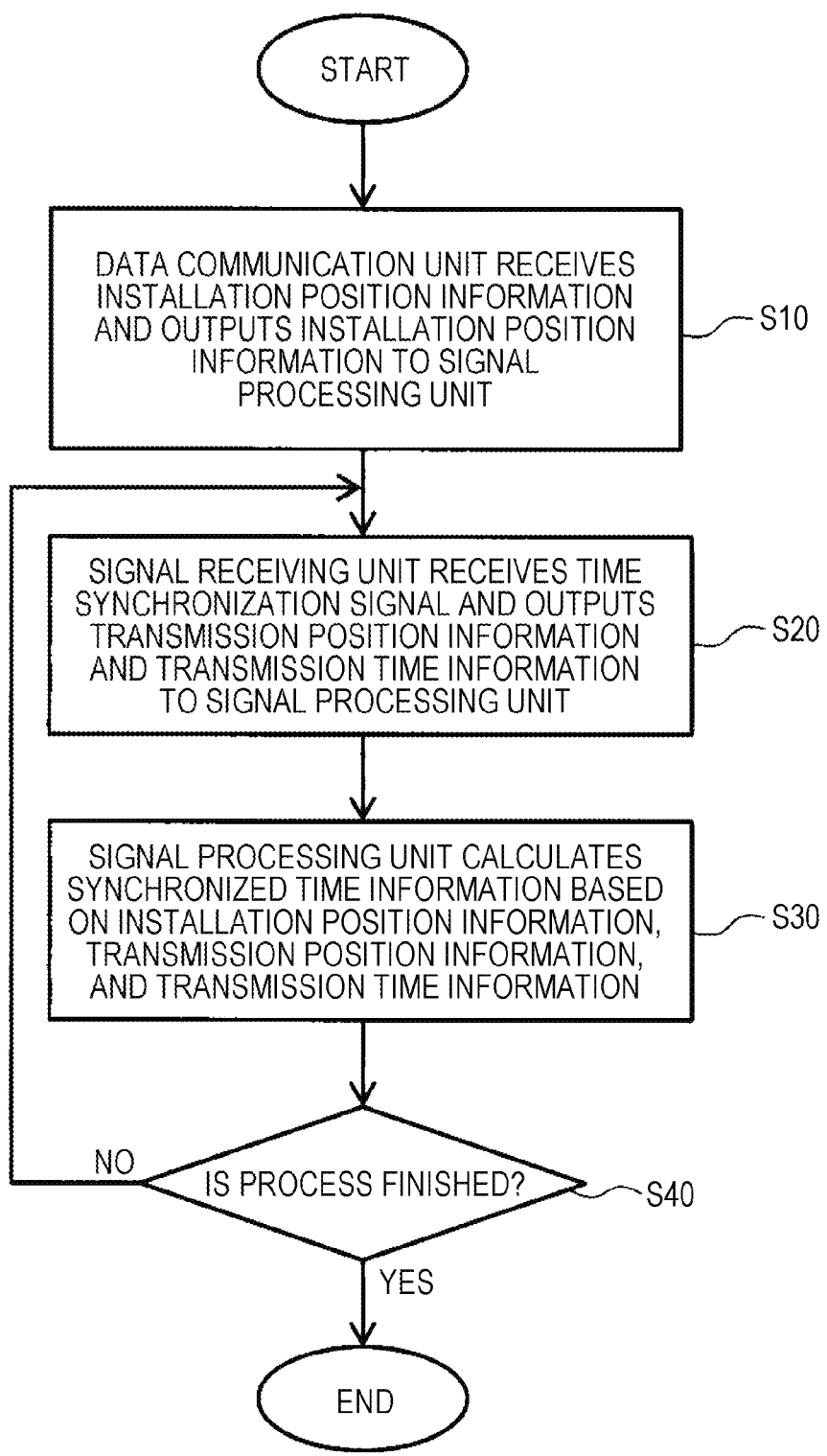
FIG. 3 is a flowchart illustrating an example of a time synchronization method that uses the time synchronization system according to the first embodiment of the present invention.
Figure 4:
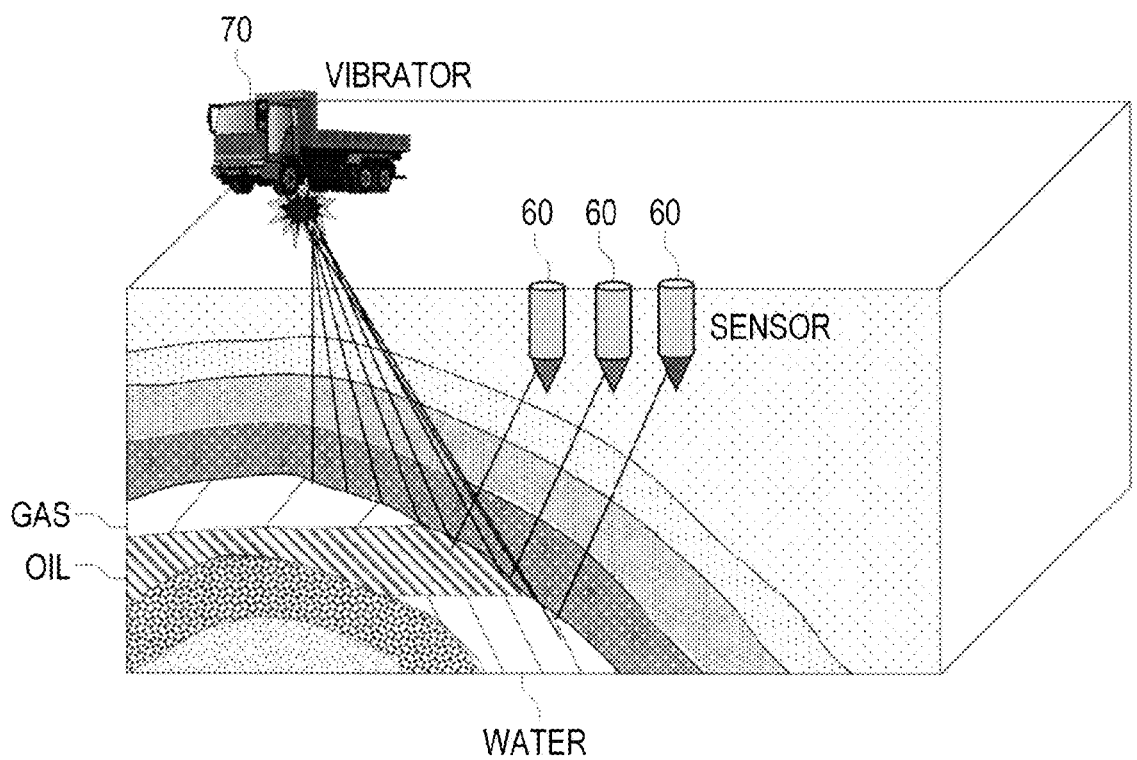
FIG. 4 is a diagram illustrating an example of a resource exploration method that uses the time synchronization system according to the first embodiment of the present invention.

Next, an example of a time synchronization method that uses the time synchronization system 1 according to the present embodiment will be described. Here, in this example, a case of a resource exploration using a seismic wave will be described. FIG. 3 is a flowchart illustrating an example of a time synchronization method that uses the time synchronization system according to the first embodiment of the present invention. FIG. 4 is a diagram illustrating an example of a resource exploration method that uses the time synchronization system according to the first embodiment of the present invention.

When an operation of the time synchronization starts, firstly, the process of step S10 is executed. In step S10, an operator places the installation position information calculation unit 90 at an installation position of the time synchronization target such as the vibrator 70 and sensor 60 illustrated in FIG. 4, for example. When the time synchronization target is the sensor 60, the operator places the installation position information calculation unit 90 on the ground where the sensor 60 is to be buried. Then, the installation position information calculation unit 90 receives a positioning signal transmitted from the positioning satellite 50 and calculates installation position information (xu, yu, zu) of the time synchronization target. Then, the installation position information calculation unit 90 transmits the calculated installation position information to the position information acquisition unit 10. Then, the position information acquisition unit 10 receives the installation position information transmitted from the installation position information calculation unit 90 and outputs the received installation position information to the signal processing unit 30.

Next, in step S20, the time synchronization signal acquisition unit 20 receives a positioning signal from the positioning satellite 50, and acquires transmission position information ($xs_n$, $ys_n$, $zs_n$) and transmission time information ($ts_n$) based on the positioning signal. Then, the time synchronization signal acquisition unit 20 outputs the acquired transmission position information and transmission time information to the signal processing unit 30.

Next, in step S30, the signal processing unit 30 calculates synchronized time information (tu) of the time synchronization target based on the installation position information output from the position information acquisition unit 10 and the transmission position information and transmission time information output from the time synchronization signal acquisition unit 20. Then, the signal processing unit 30 transmits the calculated synchronized time information tu to the time synchronization target via the information transmission/reception unit 31. Then, the time synchronization target synchronizes the time of its clock with the time of the positioning satellite 50 based on the synchronized time information tu received from the signal processing unit 30.

Next, in step S40, it is determined whether a series of processes related to the time synchronization is finished. For example, in a case that the accuracy of the calculated synchronized time information is not sufficient since the SN ratio of the received time synchronization signals is not preferable, it is determined to recalculate the synchronized time information (No) and the processes in steps S20 to S40 are executed again. On the other hand, for example, in a case that the accuracy of the calculated synchronized time information is sufficient and it is determined not to recalculate the synchronized time information (Yes), the series of processes related to the time synchronization ends. In this manner, the time synchronization with the time synchronization target is performed.

The resource exploration is performed with the vibrator 70 and a plurality of sensors 60. Thus, when the vibrator 70 and sensors 60 are installed, the processes in steps S10 to S40 are executed for the vibrator 70 and each of the sensors 60. With this, the time synchronization is performed in all the time synchronization targets with the positioning satellite 50 and the time is also synchronized between the plurality of time synchronization targets.

Effect of the Present Embodiment

According to the present embodiment, the position information acquisition unit 10 acquires previously calculated installation position information of the time synchronization target. Further, the time synchronization signal acquisition unit 20 receives a time synchronization signal from the positioning satellite 50 and acquires transmission position information and transmission time information from the time synchronization signal. Then, the signal processing unit 30 calculates synchronized time information to of the time synchronization target based on the installation position information acquired by the position information acquisition unit 10 and the transmission position information and transmission time information acquired by the time synchronization signal acquisition unit 20, and transmits the synchronized time information to to the time synchronization target.

With this configuration, the time synchronization system 1 does not have to calculate the installation position information of the time synchronization target. Further, the time synchronization signal acquisition unit 20 can acquire transmission position information and transmission time information from one time synchronization signal (positioning signal). In other words, since the time synchronization system 1 can calculate the synchronized time information when one positioning signal is received, there provide is the time synchronization system 1 that can perform time synchronization even if a small number of receivable positioning satellites 50 are receivable. In other words, there provided is the time synchronization system 1 that can perform the time synchronization even in a case that a number of positioning signals sufficient to perform the time synchronization cannot be received.

Further, according to the present embodiment, the installation position information calculation unit 90 calculates the installation position information of the time synchronization target based on the positioning signal received from the positioning satellite 50. Then, the position information acquisition unit 10 acquires the installation position information from the installation position information calculation unit 90.

With this configuration, since the installation position information of the time synchronization target is accurately calculated, there provided is the time synchronization system that can accurately perform the time synchronization of the time synchronization target.

Further, according to the present embodiment, the position information acquisition unit 10 acquires the installation position information from the installation position information calculation unit 90 via a near field wireless communication.

With this configuration, since the configuration of the data communication unit 11 in the position information acquisition unit 10 is downsized, there provided is the time synchronization system 1 that is easier to handle. Further, with this configuration, there provided is the time synchronization system 1 whose power consumption is substantially reduced compared to a case that a wireless communication such as GPS for example is performed.

Further, according to the present embodiment, the time synchronization signal acquisition unit 20 includes the directional antenna 22 facing in the zenith direction.

With this configuration, since the time synchronization signal acquisition unit 20 can selectively receive the positioning satellite 50 located in a top area in the high elevation angle, there provided is the time synchronization system 1 that can receive time synchronization signals (positioning signals) having a preferable SN ratio. Accordingly, since highly accurate transmission position information and transmission time information are acquired, highly accurate synchronized time information to can be calculated. Further, with this configuration, the time of the time synchronization target can be synchronized with the time of the positioning satellite 50 more accurately.

Number of Receivable Positioning Satellites

Figure 8:
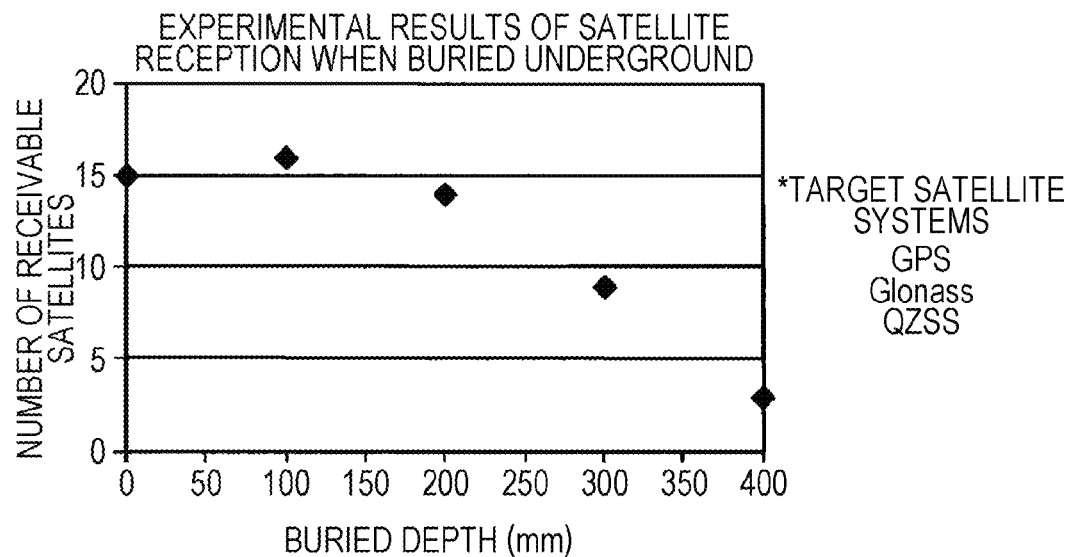
FIG. 8 is a diagram illustrating an example of a relationship between buried depths of a sensor and a number of receivable positioning satellites.
Figure 9:
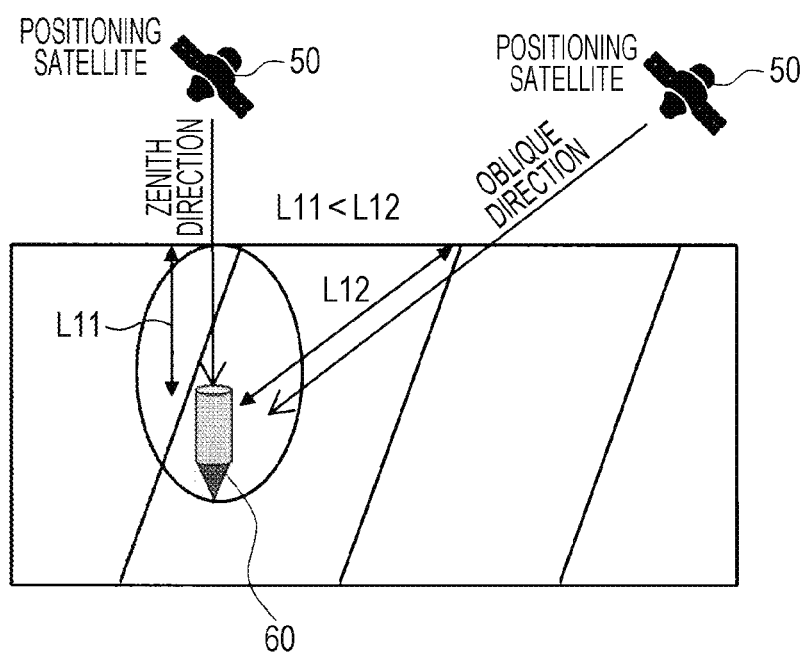
FIG. 9 is a diagram illustrating a positional relationship between a buried sensor and a positioning satellite.

Here, by using the sensor 60 as an example of the time synchronization target, a relationship between its buried depth and the number of receivable positioning satellite 50 will be explained. FIG. 8 is a diagram illustrating an example of a relationship between the sensor buried depths and the number of receivable positioning satellites. FIG. 9 is a diagram illustrating a positional relationship between the buried sensor and the positioning satellites. In a case that the depths of the buried sensor 60 is up to around 200 mm as illustrated in FIG. 8 for example, the number of positioning satellite 50 receivable by the sensor 60 is about 15. Thus, when the buried depth of the sensor 60 is in this range, the sensor 60 can receive necessary positioning signals to perform time synchronization or calculate installation position information.

However, when the buried depth of the sensor 60 becomes larger, the number of the positioning satellites 50 receivable by the sensor 60 gradually reduces. Then, when the buried depth of the sensor 60 becomes 400 mm for example, the number of positioning satellites 50 receivable by the sensor 60 reduces down to three. In this case, the sensor 60 cannot perform time synchronization or calculate installation position information by using received positioning signals.

In this manner, the reason that the number of positioning satellites 50 receivable by the sensor 60 reduces as the buried depth becomes larger is described as follows. A positioning signal transmitted from the positioning satellite 50 passes through the ground and reaches the sensor 60. The distance L11 that the positioning signal transmitted from the positioning satellite 50 at a top area of the high elevation angle passes through the ground is a distance substantially same as the buried depth of the sensor 60 as illustrated in FIG. 9. On the other hand, the distance L12 that the positioning signal transmitted from the positioning satellite 50 in a low elevation angle oblique direction passes through the ground becomes larger than the distance L11 that the positioning signal transmitted from the positioning satellite 50 at a top position passes through the ground (L11<L12), as illustrated in FIG. 9.

In this manner, the distance that the positioning signal passes through the ground becomes longer as the position of the positioning satellite 50 becomes closer to the horizontal direction. Since attenuation of the positioning signal becomes greater under the ground compared to that in the air, the positioning signal transmitted from the positioning satellite 50 at the low elevation angle is more difficult to reach the sensor 60. The condition becomes more difficult as the buried depth of the sensor 60 becomes larger and, as a result, the number of positioning satellites 50 receivable by the sensor 60 reduces. To perform high accurate resource exploration, the sensor 60 is needed to be buried a deeper place; however, since the number of positioning satellites receivable by the sensor 60 becomes small as described above, the sensor 60 cannot perform time synchronization or calculate installation position information when being buried in the ground.

Second Embodiment

Next, a second embodiment of the present invention will be described. Here, in the following explanation, regarding the parts same as those in the above described first embodiment, basically, the explanation thereof will be omitted.

Device Configuration

Figure 5:
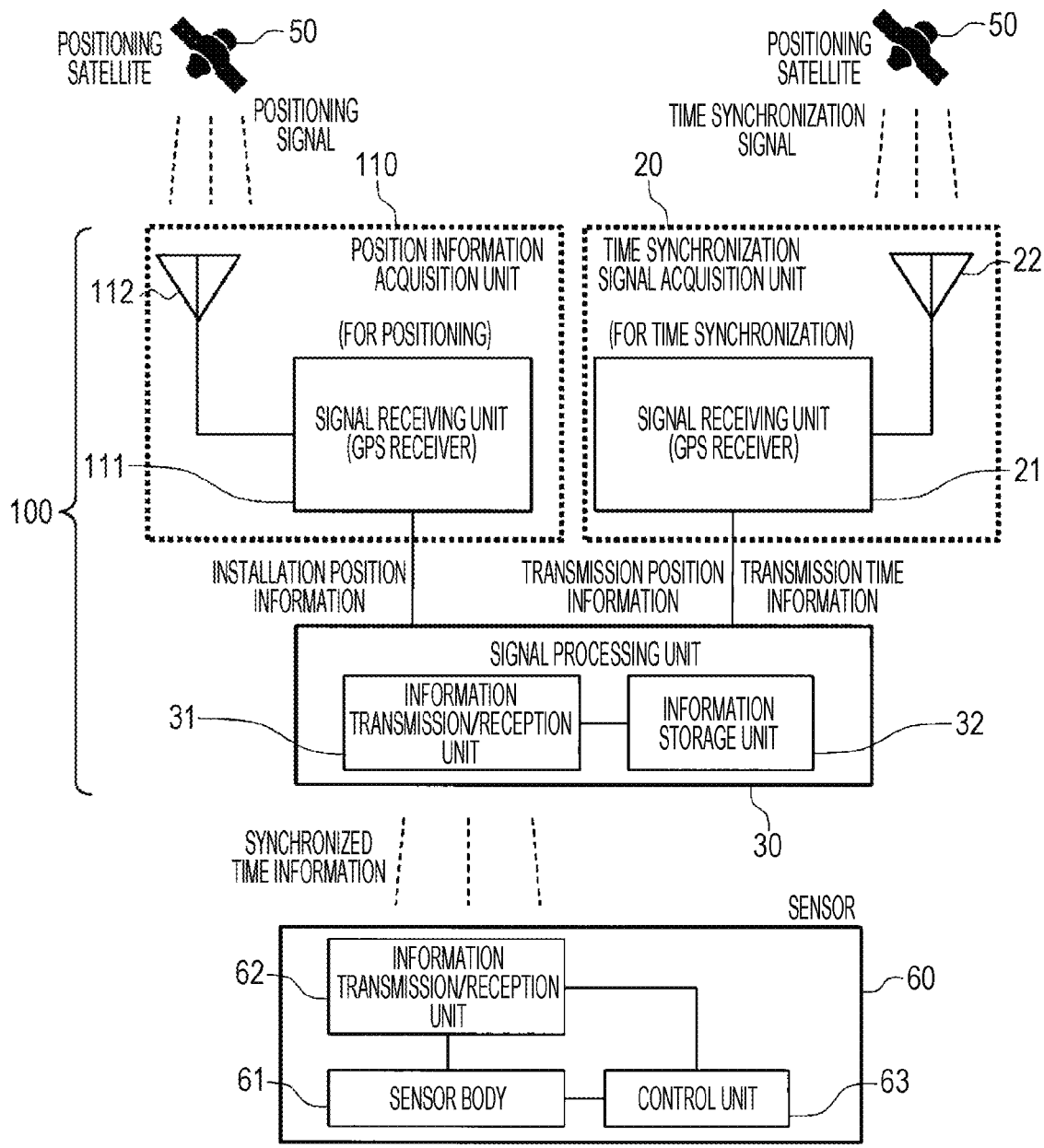
FIG. 5 is a diagram illustrating an example of a configuration of a time synchronization system according to a second embodiment of the present invention.

FIG. 5 is a diagram illustrating an example of a configuration of a time synchronization system according to the second embodiment of the present invention. As illustrated in FIG. 5, a time synchronization system 100 according to the present embodiment includes a position information acquisition unit 110, a time synchronization signal acquisition unit 20, a signal processing unit 30, and the like. Among these components, the time synchronization signal acquisition unit 20 and signal processing unit 30 have the same configurations as those in the above described first embodiment and the explanation thereof will be omitted.

The position information acquisition unit 110 receives a positioning signal transmitted from a positioning satellite 50, at an installation position of a time synchronization target such as a vibrator 70 and a sensor 60 for example, and calculates installation position information (xu, yu, zu) related to the installation position of the time synchronization target based on the positioning signal.

As illustrated in FIG. 5, the position information acquisition unit 110 includes a signal receiving unit 111 and an isotropic antenna 112. The isotropic antenna 112 receives the positioning satellites 50 located in an area from the low elevation angle close to the horizon area to the high elevation angle close to the top area. The signal receiving unit 111 is composed of a receiver for receiving a positioning signal such as a GPS signal for example, and receives a positioning signal transmitted from the positioning satellite 50 via the isotropic antenna 112. In other words, the position information acquisition unit 110 receives a GPS signal, for example, as a positioning signal.

The position information acquisition unit 110 receives positioning signals from four or more positioning satellites 50 and calculates installation position information of the time synchronization target. The position information acquisition unit 110 outputs the calculated installation position information to the signal processing unit 30. Further, the position information acquisition unit 110 may transmit the calculated installation position information to the time synchronization target such as the sensor 60 for example.

As illustrated in FIG. 5, the time synchronization signal acquisition unit 20 includes an antenna 22. The antenna 22 is a directional antenna facing in the zenith direction. The antenna 22 selectively receives a signal from a positioning satellite 50 located in the high elevation angle close to the top area. The time synchronization signal acquisition unit 20 receives a GPS signal, for example, as a time synchronization signal.

Time Synchronization Method

Next, an example of a time synchronization method that uses the time synchronization system 100 according to the present embodiment will be described with reference to the flowchart in FIG. 3.

In step S10, an operator places the position information acquisition unit 110 at an installation position of the time synchronization target such as the vibrator 70 and sensor 60 illustrated in FIG. 4 for example. In a case that the time synchronization target is a device such as the sensor 60 for example to be buried underground, the operator places the position information acquisition unit 110 on the ground where the sensor 60 or the like is to be buried. Then, the position information acquisition unit 110 receives a positioning signal transmitted from the positioning satellite 50 and calculates installation position information (xu, yu, zu) of the time synchronization target.

In steps S20 to S40, since the processes same as those in the above described first embodiment are executed, the explanation thereof will be omitted.

Effects of the Present Embodiment

The present embodiment provides the following effects in addition to the effects of the first embodiment. According to the present embodiment, the position information acquisition unit 110 receives the positioning signal and calculates installation position information of the time synchronization target.

With this configuration, since an external device for calculating the installation position information of the time synchronization target is not needed, there provided is the time synchronization system 100 that has a simplified configuration.

Further, according to the present embodiment, the position information acquisition unit 110 receives a GPS signal as a positioning signal and the time synchronization signal acquisition unit 20 receives a GPS signal as a time synchronization signal.

With this configuration, since devices having the similar configurations may be used as the signal receiving unit 111 of the position information acquisition unit 110 and the signal receiving unit 21 of the time synchronization signal acquisition unit 20, there provided is the time synchronization system 100 with reduced manufacturing cost. Further, the time synchronization system 100 can be configured simply by receiving GPS signals, which are widely used.

Further, according to the present embodiment, the position information acquisition unit 110 includes the isotropic antenna 112. With this configuration, since the position information acquisition unit 110 receives the positioning satellites 50 located widely in an area from the low elevation angle close to the horizon area to the high elevation angle close to the top area, there provided is the time synchronization system 100 that can receive positioning signals needed to calculate the installation position information of the time synchronization target.

Further, according to the present embodiment, the time synchronization signal acquisition unit 20 includes the directional antenna 22 facing in the zenith direction. With this configuration, since the antenna 22 selectively receives signals from the positioning satellite 50 in the high elevation angle close to the top area, time synchronization signals having a preferable SN ratio can be received. Accordingly, the time of the time synchronization target can be synchronized with the time of the positioning satellite 50 more accurately.

Third Embodiment

Next, a third embodiment of the present invention will be described. Here, in the following explanation, regarding the parts same as those in the above described first and second embodiments, basically, the explanation thereof will be omitted.

Device Configuration

Figure 6:
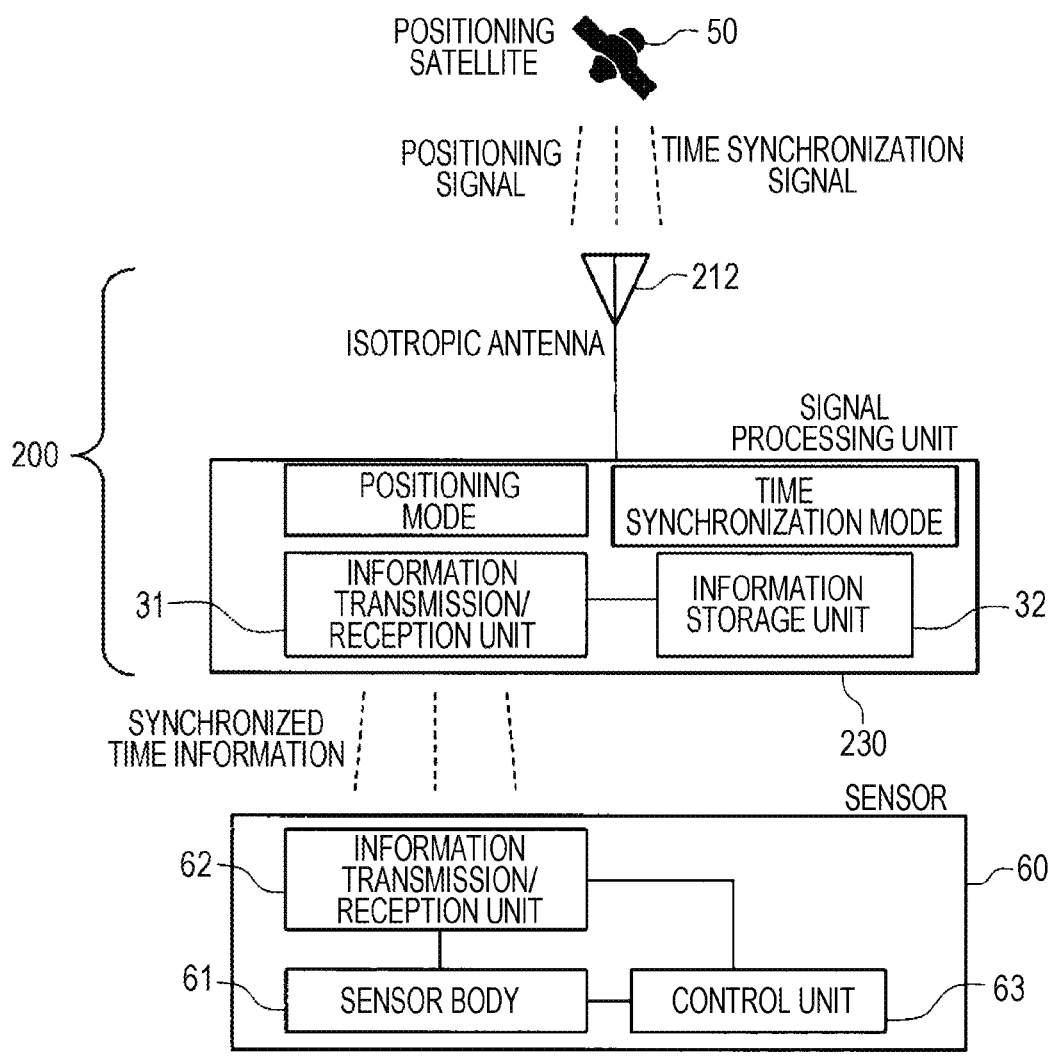
FIG. 6 is a diagram illustrating an example of a configuration of a time synchronization system according to a third embodiment of the present invention.

FIG. 6 is a diagram illustrating an example of a configuration of a time synchronization system according to the third embodiment of the present invention. As illustrated in FIG. 6, a time synchronization system 200 according to the present embodiment includes an isotropic antenna 212, a signal processing unit 230, and the like.

The isotropic antenna 212 receives the positioning satellites 50 located in a wide area from the low elevation angle close to the horizon area to the high elevation angle close to the top area. The signal processing unit 230 receives a positioning signal transmitted from a positioning satellite 50 via the isotropic antenna 212 and calculates installation position information (xu, yu, zu) related to the installation position of the time synchronization target such as a vibrator 70, a sensor 60 for example based on the received positioning signal.

Further, the signal processing unit 230 receives a positioning signal as a time synchronization signal via the isotropic antenna 212 placed at the installation position of the time synchronization target whose time is synchronized, and acquires, from the time synchronization signal, transmission position information related to the position of the positioning satellite 50 and transmission time information at the timing when the time synchronization signal is transmitted.

Then, the signal processing unit 230 calculates synchronized time information (tu) of the time synchronization target based on the installation position information of the time synchronization target and the transmission position information and transmission time information of the time synchronization signal, and transmits the synchronized time information to the time synchronization target.

In this manner, according to the present embodiment, the signal processing unit 230 is made to receive both of the positioning signal and time synchronization signal. Thus, the signal processing unit 230 performs a positioning mode for calculating the installation position information of the time synchronization target and a time synchronization mode for calculating the synchronized time information of the time synchronization target. Each of the modes may be performed by software or may be performed by hardware.

Time Synchronization Method

Next, an example of a time synchronization method by using the time synchronization system 200 according to the present embodiment will be described with reference to the flowchart in FIG. 3.

In step S10, the signal processing unit 230 is set to a positioning mode. Then, an operator places the isotropic antenna 212 at an installation position of the time synchronization target such as the vibrator 70 and sensor 60, for example, illustrated in FIG. 4. When the time synchronization target is a device such as the sensor 60 for example, which is to be buried underground, the operator places the isotropic antenna 212 on the ground where the sensor 60 or the like is to be buried. Then, the signal processing unit 230 receives the positioning signal via the isotropic antenna 212 and calculates installation position information (xu, yu, zu) of the time synchronization target based on the received positioning signal.

In step S20, the signal processing unit 230 is set to the time synchronization mode. Then, the signal processing unit 230 receives the time synchronization signal via the isotropic antenna 212 and acquires transmission position information and transmission time information from the received time synchronization signal.

In steps S30 and S40, since the processes similar to those in the above described first embodiment are executed, the explanation thereof will be omitted.

Effect of the Present Embodiment

The present embodiment can provide the following effects in addition to those of the first and second embodiments. According to the present embodiment, the signal processing unit 230 receives both of the positioning signal and time synchronization signal. With this configuration, since it is not needed to separately provide devices to receive the positioning signal and time synchronization signal, there provided is the time synchronization system 200 having a simplified configuration. Further, accordingly, since the device becomes lighter, there provided is the time synchronization system 200 that can be handled easily.

Further, according to the present embodiment, since the positioning mode and time synchronization mode are realized by software, there provided is the time synchronization system 200 that is downsized with a reduced cost.

Fourth Embodiment

Next, a fourth embodiment of the present invention will be described. Here, in the following, regarding the parts same as those in the above described first to third embodiments, the explanation thereof will be omitted.

Device Configuration

Figure 7:
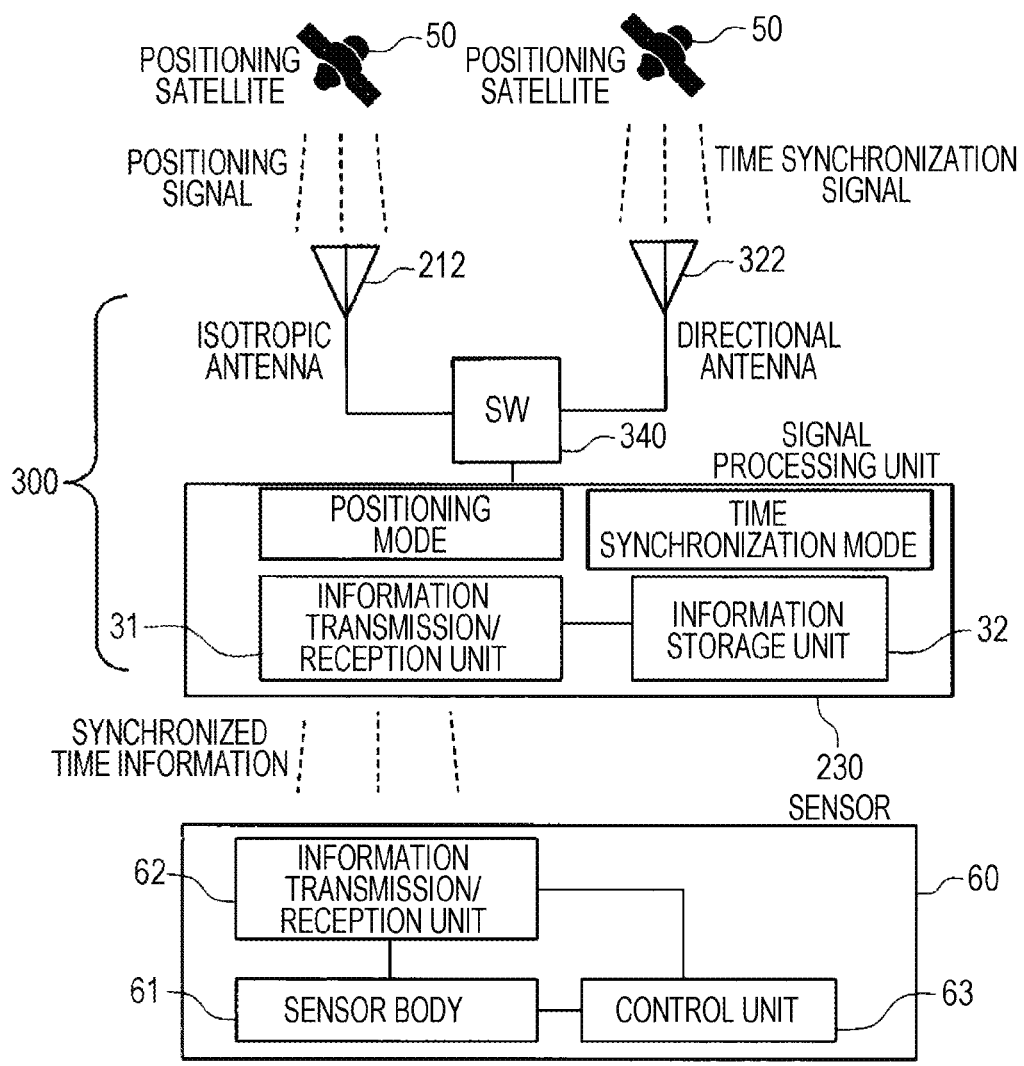
FIG. 7 is a diagram illustrating an example of a configuration of a time synchronization system according to a fourth embodiment of the present invention.

FIG. 7 is a diagram illustrating an example of a configuration of a time synchronization system according to the fourth embodiment of the present invention. As illustrated in FIG. 7, a time synchronization system 300 according to the present embodiment includes an isotropic antenna 212, a directional antenna 322, an antenna selection unit 340, a signal processing unit 230, and the like.

The directional antenna 322 is made to face in the zenith direction and selectively receives a signal from a positioning satellite 50 in the high elevation angle close to the top area.

The antenna selection unit 340 selects an antenna to connect with the signal processing unit 230. In other words, the antenna selection unit 340 switches the antennas to connect with the signal processing unit 230 between the isotropic antenna 212 and the directional antenna 322.

More particularly, in the positioning mode, when the antenna selection unit 340 selects the isotropic antenna 212, the isotropic antenna 212 and the signal processing unit 230 are connected. In this case, the signal processing unit 230 receives a positioning signal via the isotropic antenna 212 and calculates installation position information (xu, yu, zu) of the time synchronization target.

On the other hand, in the time synchronization mode, when the antenna selection unit 340 selects the directional antenna 322, the directional antenna 322 and the signal processing unit 230 are connected. In this case, the signal processing unit 230 receives a time synchronization signal via the directional antenna 322 and calculates synchronized time information (tu) of the time synchronization target.

Time Synchronization Method

Next, an example of a time synchronization method that uses the time synchronization system 300 according to the present embodiment will be described with reference to the flowchart in FIG. 3.

In step S10, the signal processing unit 230 is set to the positioning mode and the antenna selection unit 340 selects the isotropic antenna 212. Then, the signal processing unit 230 receives a positioning signal via the isotropic antenna 212 and calculates installation position information of the time synchronization target based on the received positioning signal.

In step S20, the signal processing unit 230 is set to the time synchronization mode and the antenna selection unit 340 selects the directional antenna 322. Then, the signal processing unit 230 receives a time synchronization signal via the directional antenna 322 and acquires transmission position information and transmission time information from the received time synchronization signal.

Effect of the Present Embodiment

The present embodiment provides the following effects in addition to those in the first to third embodiments. According to the present embodiment, the antenna selection unit 340 switches the antennas to connect to the signal processing unit 230 between the positioning mode and time synchronization mode.

With this configuration, since an antenna preferable to each mode is selected, there provided is the time synchronization system 300 with high performance as being made smaller and lighter.

Other Embodiments

The time synchronization system of the present invention can be applied to various systems using a wireless terminal in addition to time synchronization between the vibrator 70 and sensor 60 for a resource exploration. For example, time synchronization system may be applied to a device and the like that is placed indoor where positioning signals sufficient to perform time synchronization cannot be received.

More specifically, the time synchronization system may applied to various devices having a wireless terminal such as a vending machine and a digital signage located in a public space or a commercial facility, home appliances such as a refrigerator, a laundry machine, a microwave oven, a television, a recorder, and the like, or production equipment or the like in a factory. In this manner, the wireless terminal to which the time synchronization system according to the present invention is applied is preferable to be fixed at an installation position once installed thereto.

According to the present embodiment, there provided is the time synchronization system 1 that can perform time synchronization even in a condition that positioning signals sufficient to perform time synchronization cannot be received.

As described above, the present invention made by the present inventor has been described in detail based on the embodiments of the present invention; however, the present invention is not limited to the embodiments of the present invention and it is obvious that various changes can be made within the scope.

Here, the present invention is not limited to the above describe embodiments and various modifications may be included. For example, the above described embodiments have been described to clearly describe the present invention and the present invention is not limited to a configuration that includes all the described configurations.

Further, a part of the configuration of one embodiment may be replaced with a configuration of another embodiment, and a configuration of one embodiment may be added to a configuration of another embodiment. Further, regarding a part of a configuration of each embodiment, another configuration may be added, and deletion or replacement may be made. Here, each member or relative sizes illustrated in the drawings are simplified and idealized to clearly explain the present invention and a more complicated shape is used when actually mounted.

What is claimed is:

1. A time synchronization system comprising:
a position information acquisition unit that receives installation position information using near field wireless communication, wherein the installation position information indicates a geographic location of a time synchronization target;
a time synchronization signal acquisition unit that receives a time synchronization signal from a positioning satellite, wherein the time synchronization signal indicates a timing and a position of the positioning satellite when the time synchronization signal is transmitted by the positioning satellite; and
a signal processing unit configured to:
calculate a synchronized timing for the time synchronization target based on the installation position information and the time synchronization signal, and
transmit the synchronized timing to the time synchronization target.

2. The time synchronization system according to claim 1, wherein
the time synchronization signal is received by time synchronization signal acquisition unit using a directional antenna facing towards a zenith direction.

3. The time synchronization system according to claim 1, wherein
the time synchronization signal is a GPS signal.

4. The time synchronization system according to claim 1, wherein
the installation position information is received by the position information acquisition unit using an isotropic antenna.

5. A time synchronization system comprising:
a directional antenna;
an isotropic antenna; and
a signal processing unit that is communicatively coupled to the directional antenna and the isotropic antenna, wherein the signal processing unit is configured to:
receive, via the isotropic antenna, installation position information using near field wireless communication, wherein the installation position information indicates a geographic location of a time synchronization target,
receive, via the directional antenna, a time synchronization signal from a position of a positioning satellite, wherein the time synchronization signal indicates a timing and a position of the positioning satellite when the time synchronization signal is transmitted by the positioning satellite,
calculate synchronized timing for the time synchronization target based on the installation position information and the time synchronization signal, and
transmit the synchronized timing to the time synchronization target.

6. The time synchronization system according to claim 5, wherein
the directional antenna is configured to face towards a zenith direction.

* * * * *